US005583167A

United States Patent [19]

Chou et al.

[11] Patent Number: 5,583,167
[45] Date of Patent: Dec. 10, 1996

[54] CURING AGENTS FOR AQUEOUS EPOXY RESINS

[75] Inventors: Jason L. Chou; Shailesh Shah, both of Dresher; Brian G. Jewell, North Wales; Robert M. Moon, Maple Glenn, all of Pa.

[73] Assignee: Henkel Corporation, Plymouth Meeting, Pa.

[21] Appl. No.: 85,861

[22] Filed: Jun. 30, 1993

[51] Int. Cl.$^6$ .............................. C08K 3/20; C08L 63/02
[52] U.S. Cl. ........................ 523/404; 427/421; 528/121; 528/123
[58] Field of Search ................................. 528/121, 123; 523/404; 427/421

[56] References Cited

U.S. PATENT DOCUMENTS

| | | | |
|---|---|---|---|
| 2,651,589 | 9/1953 | Shokal et al. | 154/140 |
| 2,705,223 | 3/1955 | Renfrew et al. | 260/18 |
| 2,811,495 | 10/1957 | Wittcoff et al. | 260/18 |
| 2,864,775 | 12/1958 | Newey | 260/2 |
| 2,899,397 | 8/1959 | Aelony et al. | 260/18 |
| 3,249,412 | 5/1966 | Kolek et al. | 65/3 |
| 3,301,804 | 1/1967 | Zors et al. | 260/29.2 |
| 3,366,600 | 1/1968 | Haberliin et al. | 260/47 |
| 3,515,698 | 6/1970 | Mauz et al. | 260/75 |
| 3,538,184 | 11/1970 | Heer et al. | 528/418 |
| 3,547,881 | 12/1970 | Mueller et al. | 260/47 |
| 3,634,348 | 1/1972 | Carter et al. | 260/18 |
| 3,639,344 | 2/1972 | Kinnneman et al. | 523/404 |
| 3,931,109 | 1/1976 | Martin | 260/47 |
| 4,031,050 | 6/1977 | Jerabek | 260/29.2 |
| 4,033,917 | 7/1977 | Sekmakas et al. | 260/29.2 |
| 4,093,594 | 6/1978 | Anderson | 260/47 |
| 4,105,634 | 8/1978 | Hanson et al. | 526/64 |
| 4,113,684 | 9/1978 | Petrie | 260/29.2 |
| 4,116,900 | 9/1978 | Belanger et al. | 260/18 |
| 4,134,864 | 1/1979 | Belanger | 260/18 |
| 4,137,140 | 1/1979 | Belanger | 260/18 |
| 4,139,510 | 2/1979 | Anderson | 260/18 |
| 4,182,831 | 1/1980 | Hicks | 528/103 |
| 4,246,148 | 1/1981 | Shimp et al. | 525/526 |
| 4,315,044 | 2/1982 | Elmore et al. | 427/386 |
| 4,420,574 | 12/1983 | Moriarity et al. | 523/404 |
| 4,420,606 | 12/1983 | Waddill | 528/111 |
| 4,423,166 | 12/1983 | Moriarity et al. | 523/414 |
| 4,423,170 | 12/1983 | Waddill | 523/417 |
| 4,430,261 | 2/1984 | Schäfer et al. | 260/404.8 |
| 4,533,254 | 8/1985 | Cook et al. | 366/176 |
| 4,608,405 | 8/1986 | DeGooyer | 523/404 |
| 4,608,406 | 8/1986 | Williams et al. | 523/424 |
| 4,678,712 | 7/1987 | Elliott | 428/418 |
| 4,728,384 | 3/1988 | Goel | 156/307.3 |
| 4,738,995 | 4/1988 | Kooijmans et al. | 523/404 |
| 4,810,535 | 3/1989 | McCollum et al. | 427/410 |
| 4,824,927 | 4/1989 | Dobbelstein et al. | 528/88 |
| 4,835,225 | 5/1989 | Massingll, Jr. et al. | 525/481 |
| 4,883,830 | 11/1989 | Kitabatake et al. | 523/414 |
| 4,886,867 | 12/1989 | Lin et al. | 528/111 |
| 4,937,275 | 6/1990 | Kooijams et al. | 523/404 |
| 4,992,516 | 2/1991 | Schipfer et al. | 525/526 |
| 5,026,743 | 6/1991 | Beresford et al. | 523/404 |
| 5,032,629 | 7/1991 | Hansen et al. | 523/414 |
| 5,034,434 | 7/1991 | Beresford et al. | 523/404 |
| 5,057,557 | 10/1991 | Treybig et al. | 523/404 |
| 5,059,293 | 10/1991 | Sugishima et al. | 204/181 |
| 5,221,700 | 6/1993 | Gilbert et al. | 523/404 |
| 5,246,984 | 9/1993 | Darwem et al. | 523/404 |

OTHER PUBLICATIONS

"Water–Reducible Coatings via Epoxy Resin Modification with Jeffamine (Reg. TM) ED–2001 and Jeffamine (Reg. TM) M–1000".

"Water–Reducible Coatings via Epoxy Resin Modification with Jeffamine (Reg. ™) ED–2001 and Jeffamine (Reg ™) M–1000", 1984.

"Jeffamine® Polyoxypropyleneamine Curing Agents for Epoxy Resins", Texaco Chemical Company.

"Advanced Amine Technology for Superior Polymers", Texaco Chemical Company, 1992.

H. Lee and K. Neville, "Epoxy Polymers", *Encyclopedia of Polymer Science and Technology*, vol. 6, pp. 209–271, John Wiley and Sons, Inc., 1967.

*Encyclopedia of Polymer Science and Engineering*, John Wiley and Sons, New York, NY, vol. 6, pp. 340–361.

W. C. Griffith, "Emulsions", *Encyclopedia of Chemical Technology*, vol. 8, pp. 900–930, John Wiley and Sons, New York, NY, 1979.

*Primary Examiner*—Melvyn I. Marquis
*Assistant Examiner*—D. Aylward
*Attorney, Agent, or Firm*—Wayne C. Jaeschke; John Daniel Wood; Daniel S. Ortiz

[57] ABSTRACT

Provided are epoxy curing agents comprising the reaction product of reactants consisting essentially of an alkylene polyamine having less than about 12 carbon atoms, an aromatic mono-glycidyl ether having less than about 18 carbon atoms, and a diglycidyl ether of an aromatic diol having an average degree of oligomerization of less than about 3.5, wherein the ratio of primary amine equivalents of said alkylene polyamine to the total epoxide equivalents of said aromatic glycidyl ether and said diglycidyl ether of an aromatic diol is not essentially less than one, and the ratio of epoxide equivalents of said aromatic mono-glycidyl ether to epoxide equivalents of said diglycidyl ether of an aromatic diol is greater than one. The reaction product is preferably employed as a curing agent for an aqueous epoxy resin in a two component coating system wherein said curing agent, essentially free of acids, is mixed with an aqueous epoxy resin emulsion and then the resulting mixture is applied as a continuous coating to a rigid substrate, e.g. as an industrial maintenance coating.

70 Claims, No Drawings

CURING AGENTS FOR AQUEOUS EPOXY RESINS

FIELD OF THE INVENTION

The present invention relates to curing agents for aqueous epoxy resins and to their use. More particularly, it relates to the reaction product of polyamines with glycidyl ethers that are useful as curing agents for aqueous epoxy resin emulsions, which cured resins are, in turn, useful as protective coatings.

Background of the Invention

Solvent based, epoxy resin curing agent systems have been known for many years. However, these solvent systems often are quite flammable and many exhibit disagreeable odors. In recent years, increasingly strict regulation of environmental pollutants has lead to a limitation on the types and amounts of organic solvents which can be used in epoxy resin curable systems. The first approach to these limitations on the solvent content of coating systems was simply to employ a surfactant and emulsify or disperse existing solvent-based polymeric systems in water. Examples of such systems include U.S. Pat. No. 3,301,804 which discloses the use of the reaction product of boric acid, an alkylene glycol, and a beta-dialkyl-substituted aminoalkanol as an emulsifier, U.S. Pat. No. 3,634,348 which discloses the use of a phosphate ester as an emulsifying agent, and U.S. Pat. No. 3,249,412 which discloses the use of a combination of a cationic emulsifying agent, selected from the group consisting of imidazolines and amides, and a non-ionic emulsifying agent.

However, the cured products which result from these emulsions or dispersions may exhibit poor properties when compared to prior art solvent-based systems. In particular, the chemical and water resistance of such systems may be lower because of the high levels of surfactant which were needed.

U.S. Pat. No. 4,166,900 discloses cathodic electrodeposition resins prepared based upon polyepoxides, polyamines and monoepoxides. Polyepoxide resins are adducted with polyamines which are further reacted with a monoepoxide or a monocarboxylic acid. It is disclosed that the resinous adducts are water soluble or water dispersible when salted with an acid. It is also stated that the resin solutions or dispersions are particularly useful in cathodic electrodeposition processes for prime coating metal objects.

U.S. Pat. No. 4,246,148 discloses a two component industrial maintenance coating. The first component is a polyamine terminated epoxy resin which is end capped with a monoepoxide, at least 25 mole percent of the monoepoxide being an aliphatic monoepoxide. The second component is a low molecular weight polyepoxide crosslinker. It is disclosed that the adduct can be dissolved or dispersed in water when salted with an acid. The polyepoxide crosslinker can then be microemulsified in the system. When coated on a substrate, the two component mixture is said to cure at room temperature producing coatings having a balance of chemical and physical properties.

U.S. Pat. No. 4,608,405 discloses an ambient temperature curing agent used to cure epoxide resins. The curing agent preferably is prepared by coreacting under liquid advancement conditions, a diglycidyl ether of a dihydricphenol, a diglycidyl ether of an aliphatic dihydroxy polyether and a dihydricphenol to produce a product having an average weight per epoxide (WPE) of about 400 to about 1300. Substantially all of the epoxy groups which remain in the advanced product are then reacted with a polyamine and at least each primary amine group of the polyamine/diepoxide reaction product is further reacted with a monoepoxide or a monocarboxylic acid. It is stated that these curing agents may be salted with a volatile acid and employed in aqueous systems to provide coatings having superior cured states film properties. It is also stated that, while the preparations of these curing agents by the liquid advancement process is preferred, it is also possible to prepare similar curing agents by starting with the corresponding dihydric phenol and aliphatic dihydroxy polyether and epoxidizing this mixture using well known epoxidization techniques.

SUMMARY OF THE INVENTION

This invention relates to epoxy curing agents comprising the reaction product of reactants consisting essentially of:

an alkylene polyamine having less than about 12 carbon atoms (preferably a member selected from the group consisting of lower alkylene diamines and lower polyalkylene polyamines, said member having from 2 to carbon atoms and, more preferably, only straight-chain alkylene groups), an aromatic mono-glycidyl ether having less than about 18 carbon atoms (preferably selected from the group consisting of mono-alkylphenyl glycidyl ethers and di-alkyl phenyl glycidyl ethers having from 9 to 13 carbon atoms), and a diglycidyl ether of an aromatic diol having an average degree of oligomerization of less than about 3.5 (preferably less than about 1.5, and preferably derived from an alkyl bis-phenol, e.g. bisphenol A), wherein:

the ratio of primary amine equivalents of said alkylene polyamine to the total epoxide equivalents of said aromatic glycidyl ether and said diglycidyl ether of an aromatic diol are not less than essentially one, and the ratio of epoxide equivalents of said aromatic mono-glycidyl ether to epoxide equivalents of said diglycidyl ether of an aromatic diol is greater than one (preferably greater than 1.5, more preferably from about 2:1 to about 6:1, and most preferably from about 3:1 to 5:1). In preferred embodiments, the alkylene polyamine is not pre-reacted with the diglycidyl ether of an aromatic diol and, thus, said ratio of epoxide equivalents of said aromatic mono-glycidyl ether to epoxide equivalents of said diglycidyl ether of an aromatic diol is at no time during the entire course of the reaction, less than the final product ratio of epoxide equivalents of said aromatic mono-glycidyl ether to epoxide equivalents of said diglycidyl ether of an aromatic diol. (By "final product ratio" is meant the ratio of all epoxide equivalents of said aromatic mono-glycidyl ether added over the entire course of the reaction to all epoxide equivalents of said diglycidyl ether of an aromatic diol added over the entire course of the reaction.) The maintenance of such a ratio can accomplished by co-addition of proportionally adjusted amounts said aromatic mono-glycidyl ether and said diglycidyl ether of an aromatic diol (which will maintain the final product ratio essentially throughout said reaction) or by pre-reacting the mono-glycidyl ether with the alkylene polyamine (which will maintain an even greater ratio than the final product ratio for most of the course of the reaction).

This invention also relates to a first group of preferred embodiments within the broad scope set forth above wherein the alkylene polyamine is a polyalkylene polyamine and the ratio of primary amine equivalents of said alkylene polyamine to the total epoxide equivalents of said aromatic glycidyl ether and said diglycidyl ether of an aromatic diol is essentially one, i.e. the molar equivalents of primary amine groups of said polyalkylene polyamine is essentially equal to the molar equivalents of glycidyl groups (e.g. a ratio of from about 0.85:1 to about 1.05:1, preferably from about 0.90:1 to about 0.95:1).

This invention further relates to a second group of preferred embodiments within the broad scope set forth above, wherein the alkylene polyamine is a mono-alkylene polyamine and the ratio of primary amine equivalents of said alkylene polyamine to the total epoxide equivalents of said aromatic glycidyl ether and said diglycidyl ether of an aromatic diol is greater than essentially one, i.e. the molar equivalents of primary amine groups of said polyalkylene polyamine are essentially in excess of the molar equivalents of glycidyl groups (e.g. a ratio of from about 1.05:1 to 2.0:1, preferably from about 1.1:1 to about 1.75:1, more preferably from about 1.2:1 to about 1.5:1 ).

This invention also relates to a third group of preferred embodiments wherein said alkylene polyamine is comprised of a major amount on a molar basis of a mono-alkylene polyamine and a minor amount on a molar basis of a polyalkylene polyamine (preferably in a molar ratio of from about 6:1 to about 2.5:1, more preferably from about 5:1 to about 3:1).

The reaction product is preferably employed as a curing agent for an aqueous epoxy resin in a two component coating system wherein said curing agent, essentially free of acids, is mixed with an aqueous epoxy resin emulsion and then the resulting mixture is applied as a continuous coating to a rigid substrate.

Detailed Description of the Invention

The curing agents of this invention are prepared from three major reaction components. The first component is an alkylene polyamine, the second component is an aromatic glycidyl ether, and the third component is diglycidyl ether of an aromatic diol. The nature of these components will be addressed in turn below.

The alkylene polyamines useful in this invention can be characterized as lower alkylene polyamines and lower polyalkylene polyamines. These materials are commercially available or can be prepared by conventional preparative techniques. These contain at least 2 amine nitrogen atoms per molecule, at least 3 amine hydrogen atoms per molecule and no other groups which are reactive with epoxide. Useful polyamines typically contain about 2 to about 6 amine nitrogen atoms per molecule, 3 to about 8 amine hydrogen atoms, and 2 to about 12 carbon atoms. Mixtures of amines can also be used.

Examples of such amines are the alkylene polyamines ethylene diamine, 1,2-propylene diamine, 1,3-propylene diamine, 1,2-butylene diamine, 1,3-butylene diamine, 1,4-butylene diamine, 1,5-pentylene diamine, 1,6-hexylene diamine, 1,7-heptylene diamine, 1,10-decylene diamine, and the like. Preferred amines for use in this invention are polyamines of the formula $H_2N-R(-NH-R)_n-NH_2$ wherein n is 0 to 4 and R is an alkylene group containing 2 to 8 carbon atoms, provided that the total carbon atoms do not exceed 12. Examples of the preferred mono-alkylene polyamines include 1,4-butylene diamine (tetramethylene diamine), 1,6-hexylene diamine (hexamethylene diamine), and 1,8-octylene diamine (octamethylene diamine). The polyalkylene polyamines have at least one secondary amine group. Examples of polyalkylene polyamines include diethylene triamine, triethylene tetramine, tetraethylene pentamine, pentaethylene hexamine, dipropylene triamine, tributylene tetramine, trimethylhexamethylene diamine, hexamethylene triamine and the like. The more preferred polyalkylene polyamines are the polyethylene polyamines with the most preferred being triethylene tetramine and diethylene triamine.

Cyclic diamines can also be included in the diamine component, preferably, however only in minor amounts, e.g. at less than 10%, and preferably less than 5%, of the primary amine equivalents. Examples of cyclic diamines include 1,4-diaminocyclohexane, 1,2-diaminocyclohexane, o, m and p-phenylene diamine, 4,4'-methylene dianiline, meta-xylylene diamine, and isophorone diamine.

In certain embodiments of the invention, the amine component is comprised of a major amount on a molar basis of a mono-alkylene polyamine and a minor amount on a molar basis of a polyalkylene polyamine (preferably in a molar ratio of from about 6:1 to about 2.5:1, more preferably from about 5:1 to about 3:1). It has been found that the use of both a mono-alkylene polyamine and a polyalkylene polyamine has certain advantages over the use of a mono-alkylene polyamine alone. One important advantage is that the polyalkylene polyamine appears to prevent precipitation of the curing agent that can occur upon storage. Without wishing to be bound by any theory, unless expressly noted otherwise, it is thought that the molecular structure of a mono-alkylene polyamine, such as hexamethylene diamine, may allow the molecular species of curing agent prepared therefrom to associate in a manner that allows the curing agent to crystallize or otherwise precipitate. The use of an amount of a polyalkylene polyamine in an amount sufficient to inhibit such precipitation (e.g. a molar ratio of mono-alkylene polyamine to polyalkylene polyamine of less than about 4:1 ) thus allows one of ordinary skill to extend the shelf life of the curing agent, if so desired.

The polyepoxide materials useful in this invention are glycidyl polyethers of dihydric phenols and contain, on average, more than one, but not more than two 1,2-epoxide groups per molecule. Such polyepoxide materials are derived from an epihalohydrin and a dihydric phenol and have an epoxide equivalent weight of about 100 to about 4000, preferably from about 125 to about 525, and more preferably from about 150 to about 350. Examples of epihalohydrins are epichlorohydrin, epibromohydrin and epiiodohydrin with epichlorohydrin being preferred. Dihydric phenols are exemplified by resorcinol, hydroquinone, p,p'-dihydroxydiphenylpropane (or Bisphenol A as it is commonly called), p,p'-dihydroxybenzophenone, p,p'-dihydroxydiphenyl, p,p'-dihydroxyphenyl ethane, bis(2-hydroxynaphthyl)methane, 1,5-dihydroxynaphthalene and the like with Bisphenol A being preferred.

These polyepoxide materials are well known in the art and are made in desired molecular weights by reacting the epihalohydrin and the dihydric phenol in various ratios or by reacting a dihydric phenol with a lower molecular weight polyepoxide material. Preferred polyepoxide materials are glycidyl polyethers of Bisphenol A having epoxide equivalent weights of about 150 to about 525 and, thus, have from just greater than 1.0 (e.g. from about 1.1) to just less than 3.5 (e.g. up to about 3.4) dihydric phenol groups per polyether molecule, and more preferably have epoxide equivalent weights of less than 400.

The third component is an aromatic mono-glycidyl ether, i.e., a compound having at least one aromatic ring having attached thereto an glycidyl functional group and no other reactive functional groups. Representative examples of aromatic mono-glycidyl ethers include the monoglycidyl ethers of monohydric aromatic alcohols such as phenol and naphthanol, mono- or dialkyl-substituted monoglycidyl ethers of monohydric aromatic alcohols, said alkyl groups having from about 1 to about 4 carbon atoms, such as the monoglycidyl ether of o-cresol, m-cresol, p-cresol, o-ethyl-phenol, m-ethyl-phenol, p-ethyl-phenol, o-(n-propyl)-phenol, m-(n-propyl)-phenol, p-(n-propyl)-phenol, o-isopropyl-phenol, m-isopropyl-phenol, p-isopropyl-phenol, o-(n-butyl)-phenol, m-(n-butyl)-phenol, p-(n-butyl)phenol, m-(t-butyl)-phenol, p-(t-butyl)-phenol, 2,4-dimethyl-phenol, 3,5-dimethyl-phenol, 3-methyl-5-ethyl-phenol, 2-methyl-4-(n-propyl)-phenol, or 2-methyl-4-(t-butyl)-phenol. The preferred aromatic mono-glycidyl ether is o-cresyl glycidyl ether.

The ratios of the reactants are selected so that the primary amine equivalents of said alkylene polyamine to the total epoxide equivalents of said aromatic glycidyl ether and said diglycidyl ether of an aromatic diol are essentially equal. This means that, on average, all of the primary amine groups will be converted to secondary amines (i.e. a group still having a reactive secondary amine hydrogen, albeit less reactive than a primary amine hydrogen), Preferably less than 10% and more preferably less than 5% of primary amine hydrogens will remain in the curing agent.

As discussed above, in preferred embodiments, the alkylene polyamine is not pre-reacted with the diglycidyl ether of an aromatic diol and, thus, said ratio of epoxide equivalents of said aromatic mono-glycidyl ether to epoxide equivalents of said diglycidyl ether of an aromatic diol is at no time during the entire course of the reaction, no less than the final product ratio of epoxide equivalents of said aromatic mono-glycidyl ether to epoxide equivalents of said diglycidyl ether of an aromatic diol. (By "final product ratio" is meant the ratio of all epoxide equivalents of said aromatic mono-glycidyl ether added over the entire course of the reaction to all epoxide equivalents of said diglycidyl ether of an aromatic diol added over the entire course of the reaction.) The maintenance of such a ratio can accomplished by co-addition of proportionally adjusted amounts said aromatic mono-glycidyl ether and said diglycidyl ether of an aromatic diol (which will maintain the final product ratio essentially throughout said reaction) or by pre-reacting the mono-glycidyl ether with the alkylene polyamine (which will maintain an even greater ratio than the final product ratio for most of the course of the reaction). Of course, because of the possibility of differing rates of reactivity with the alkylene polyamine, the ratio of mono-glycidyl ether to aromatic diol may vary somewhat over time in the reaction medium. Because the mono-glycidyl ether is present in the reaction from the beginning of the reaction, however, the resulting reaction product will have a relatively smaller degree of polymerization, for example, as compared with the use of a mono-glycidyl ether solely as a capping agent for an adduct of a polyamine and a polyepoxide.

Moreover, the ratio of epoxide equivalents of said aromatic mono-glycidyl ether to epoxide equivalents of said diglycidyl ether of an aromatic diol is greater than 1, preferably greater than 1.5, and more preferably from about 2:1 to about 6:1, and most preferably from about 3:1 to 5:1. Thus, the reaction product will be comprised predominantly (e.g. greater than 60% by weight) of species derived from the reaction of two mono-glycidyl ether molecules with one alkylene polyamine and only a minor amount (e.g. less than 35% by weight) of species derived from the reaction of one diglycidyl ether of an aromatic diol with two alkylene polyamine molecules and two aromatic mono-glycidyl ether molecules. Further, because the secondary amine hydrogen atoms of a polyalkylene polyamine are reactive, there is the possibility for some branching of the molecule, but use of a relatively high ratio of mono-glycidyl ether to diglycidyl ether of an aromatic diol (optionally along with a low reaction temperature) will reduce such a possibility dramatically, such that the reaction product will be essentially free of branched species.

While not wishing to exclude any other components unnecessarily, it is noted that the use of glycidyl ethers of polyoxyalkylenes and/or volatile acids to salt the curing agent are not needed in the curing agent and so should be excluded. Further, it is believed that the selection of components is so important to the performance of the curing agent that other components which would affect the essential attributes of the curing agent, or cured epoxy resins prepared therefrom, should be excluded. The skilled artisan will, with the aid of the following description, be able to determine whether a particular component in a particular amount will affect the attributes of the curing agent in an essential manner, i.e. will prohibit its use as a curing agent for an aqueous epoxy emulsion used to prepare a protective coating when cured.

The reaction medium is typically maintained at moderate temperatures during the reaction. Such temperatures avoid degradative side reactions which can affect the appearance (e.g. by excessive color formation) of the reaction product. Typical temperatures that will be maintained during the reaction range from about 35° C. to about 80° C., preferably from about 40° C. to about 75° C., for a time sufficient to bring the reaction to completion, typically about 5 minutes to 3 hours. Lower temperatures may be employed at the expense of increasing the reaction time. The reaction medium is also typically treated to exclude oxygen to a practicable degree, e.g. by blanketing and/or sparging the reaction zone with an inert gas, e.g. dry nitrogen.

The product which results after the epoxide material has been reacted with the polyamine is extremely viscous and it is preferred that an oxygenated solvent be present in the reaction medium or added to the reaction product to reduce its viscosity. The preferred solvents are the glycol ethers such as the various lower alkyl ethers of ethylene and propylene glycol. Typically, about 20 to about 50 percent by weight of an alkoxy-alkanol, e.g. 2-propoxy ethanol, or another oxygenated solvent may be used.

The second major component of the coating system is a water dispersible (either alone or in the presence of a co-solvent) epoxy resin having more than one terminal epoxide group. The epoxy resins suitable for use in the second component include the glycidyl polyethers of dihydric phenols as well as epoxy novolac resins. The dihydric phenols employed to prepare the epoxy resins are further described in U.S. Pat. No. 4,246,148. It is particularly preferred to employ those glycidyl polyethers wherein the dihydric phenol is bisphenol-A. Examples of suitable resins include those disclosed in U.S. Pat. No. 4,315,044, the disclosure of which is incorporated herein by reference. Particularly preferred epoxy resins are self-dispersing curable epoxy resin prepared by contacting (a) 1.0 reactive equivalents of an epoxy resin, (b) from about 0.1 to 1.0 reactive equivalents, preferably from 0.4 to 0.6 reactive equivalents of a polyhydric phenol, and (c) from about 0.005 to 0.025 reactive equivalents, preferably from about 0.005 to 0.015 reactive equivalents, of an amine-epoxy adduct, wherein the amine-epoxy adduct is formed by contacting 1.0 equivalents of an aliphatic polyepoxide and from about 0.3 to 0.9 reactive equivalents of a polyoxyalkyleneamine.

The maximum molecular weight of the epoxy resins is limited by the fact that the amount of epoxy resin employed in the second component is usually selected to achieve stoichiometric equivalence of epoxy groups with the amine hydrogen equivalents of the curing agent. Consequently, as the molecular weight of the epoxy resin increases, thereby increasing the epoxide equivalent weight, more of the epoxy resin is required to satisfy the stoichiometric requirement. However, the use of large amounts particularly of higher molecular weight epoxy resins is not preferred because they are water insoluble and become increasingly more difficult to microemulsify or disperse as the amount thereof is increased.

In view of the above, it is preferred to characterize the epoxy resin also in terms of its epoxide equivalent weight. Thus, the epoxide equivalent weight (WPE) of the glycidyl polyethers of dihydric phenols is not greater than about 1000, preferably from about 180 to about 700.

As described above, the amount of epoxy resin which is present in the coating composition is preferably sufficient to achieve substantially stoichiometric equivalence with the reactive amino hydrogens on the end capped epoxy-amine adduct. In general, it is preferred to employ the epoxy resin in an amount sufficient to achieve an epoxy to reactive amine hydrogen equivalent weight ratio of from about 0.5:1.0 to about 1.5:1.0, and, preferably, from about 0.8:1.0 to about 1.2:1.0.

The epoxy resins which are useful herein, may be either liquids or solids, so long as the resin is in the form of a stable aqueous dispersion. Preferred aqueous dispersions of epoxy resins contain a self-dispersing curable epoxy resin prepared by contacting (a) 1.0 reactive equivalents of an epoxy resin, (b) from about 0.01 to 1.0 reactive equivalents, preferably from 0.4 to 0.6 reactive equivalents of a polyhydric phenol, and (c) from about 0.005 to 0.025 reactive equivalents, preferably from about 0.005 to 0.015 reactive equivalents of an amine epoxy adduct, wherein the amine-epoxy adduct is formed by contacting 1.0 equivalents of an aliphatic polyepoxide and from about 0.3 to 0.9 reactive equivalents of a polyoxyalkyleneamine.

When the epoxy resin and the curing agent are mixed, the resulting coating composition exhibits a useful pot life at room temperature, e.g. from about 2 hours to about 12 hours, and more typically from about 3 hours to about 8 hours. The pot life of the coating composition is herein defined to be the elapsed time from mixing the components together until the resulting composition is no longer suitable, with normal thinning, for application by spray, brush, or roll coating techniques to a substrate. The suitability for application by common techniques can be expressed in terms of the viscosity of the coating composition. Thus, the pot life of unpigmented coatings can be characterized as the elapsed time from mixing the two components to the time when the viscosity of the coating compositions drops below A1 or increases above Z6 as determined by the Gardner-Holdt method. For pigmented coatings, useful applications viscosities are between 50 and 140 Kreb Units (K.U.) as determined with a Stormer viscometer.

Coatings based on the compositions described herein can be formulated into easily handled two-package systems which blend together as easily as their solvent based counterparts. Application by brush, spray and roller-coating are typically free of bubbling and other film imperfections.

The coating systems described herein should also exhibit good adhesion to such widely varied substrates as galvanized metal, cold rolled steel (untreated and phosphate treated), hot rolled steel, and aluminum. Flash rusting is not a problem over untreated steel and, therefore, there is no need for special additives as in some water reducible epoxy systems. Adhesion should also be excellent to three and four-year old alkyd and epoxy ester enamel films. Such systems may therefore be employed for repaint purposes in food processing plants and dairies and can also be used as adhesive compositions per se.

As pointed out above, a major advantage of the coating compositions of the instant invention is that they are useful in preparing solvent and chemically resistant coating compositions from aqueous based systems. These systems do not exhibit the traditional solvent related problems shown by solvent based systems and accordingly are preferred in end-use applications where nonpolluting or nonflammable coatings systems are necessary. In addition, the cured state properties of compounds made from the curing agents disclosed herein are generally equivalent or superior to the properties of compounds prepared from prior art solvent based systems.

The following examples will serve to further illustrate the invention, but should not be construed to limit the invention, unless expressly set forth in the appended claims. All parts, percentages, and ratios are by weight unless otherwise indicated in context.

EXAMPLES

EXAMPLES 1–4

Curing agents were prepared by charging to a flask the amine reactants diethylenetriamine (DETA), 1,2-diaminocyclohexane (DACH), hexamethylenediamine (HMDA) in the molar amounts set forth Table 1, below, along with the solvent 2-propoxyethanol, with mixing and under dry nitrogen gas. The contents were heated to 40° C. The epoxide reactants cresyl glycidyl ether (CGE) and a bisphenol A diglycidyl ether homopolymer having an average of 1.15 bisphenol A groups per molecule and available from the Dow Chemical Co. as DER 331, were pre-mixed in the molar amounts shown in Table 1 and the pre-mixture was added dropwise to the charge flask to maintain the temperature within the flask to less than 70° C. Once the addition of epoxide reactants was complete, the flask was held at 50° C. for about 2 hours.

TABLE 1

| | Curing Agent Composition | | | | |
|---|---|---|---|---|---|
| Example | DETA (moles) | DACH (moles) | HMDA (moles) | CGE (moles) | DER 331 (moles) |
| 1 | 1.00 | 0.04 | 0.04 | 1.72 | 0.22 |
| 2 | 1.00 | 0.04 | 0.04 | 1.30 | 0.43 |
| 3 | 0.17 | 0.03 | 0.80 | 0.96 | 0.12 |
| 4 | 0.17 | 0.03 | 0.80 | 1.20 | 0.15 |

Example 5

Into a 250 ml reaction flask equipped with heating mantle, nitrogen line, cooling condenser, thermometer and a stirring means is charged 66.4 grams (0.348 equivalents) of a diglycidyl ether of bisphenol A, and 19.6 grams (0.172 equivalents) of bisphenol A. The reactants are heated to 95° C. and then 12.0 grams (0.004 equivalents) of an amine-epoxy adduct are added with 0.15 grams triphenyl phosphorus.

The amine-epoxy adduct is formed by heating a mixture of 485 grams (0.4 equivalents) of Jeffamine® 2000 (Texaco Chemical Co., Houston, Tex.) and 142.2 grams (0.61 equivalents) of a polyepoxide of propoxylated (5 PO) pentaerythritol (Henkel Corp.). The mixture is heated slowly to 125°–130° C. with stirring and held at this temperature for about 2.5 hours. The reaction mixture is cooled to 70° C. and analyzed for epoxide and amine content. The product amine polyepoxy adduct has 0.4 meq/gm of total amine and 0.33 meq/gm of epoxide which indicates that about 66% of the initial free epoxide groups have been reacted with the amine.

The mixture is heated slowly to 150° C. with stirring whereupon an exothermic reaction is observed. The reaction temperature is maintained between 150° C. and 160° C. After the exothermic reaction subsides, the reaction mixture is maintained at 160° C. for an additional hour followed by a 15-minute period at 190° C. The reaction mixture is then cooled to 1600° C. and 14 grams of propyl cellosolve is added which immediately begins refluxing. The reaction mixture is cooled to 100° C. and analyzed. The serf-dispersing resin, is present at 87.5% solids in propyl cellosolve and has a 0.07 meq/gm total amine and an epoxide equivalent weight of 552 based on resin solids.

The self-dispersing curable epoxy resin is introduced into a 500 ml reaction flask equipped with heating mantle, nitrogen line, cooling condenser and thermometer in an amount of 112 grams. The resin is heated to 100° C. whereupon 16.5 grams of water are added gradually with stirring over a 30-minute period while the temperature is reduced to 55° C. An additional 48 grams of water are added and the temperature raised to 70° C. over a 20-minute period. At 70° C., 2 grams of water are added followed by stirring for 20 minutes and the subsequent addition of 3 grams of water. The resulting water-in-oil dispersion is stirred for 45 minutes while cooling to 45° C. An oil-in-water emulsion is formed. To the oil-in-water dispersion are added 2.0 grams of a $C_8$–$C_{10}$ alcohol mono-glycidyl ether as a reactive diluent. Then 36.3 grams of water are added at 50° C. over a 1-hour period. The resulting water-borne dispersion contains 56% resin solids in a water/propyl cellosolve (82/18) solvent, in an amount of 200 parts by weight was ground with 123.7 parts by weight of titanium dioxide pigment (DuPont R-960) along with 17 parts by weight of oxygenated solvent (Ektasolve EP), and 103.9 parts by weight of water. To this grind paste was added 44.7 parts by weight of the curing agent of Example 1, above. The resulting white epoxy paint thus had a ratio of epoxy equivalents to active amine hydrogen equivalents of 1:1, a pigment to binder ratio of 0.85:1, and 55% non-volatiles (by calculation). This coating composition was applied to cold rolled steel at a thickness of 56 micrometers to 62 micrometers. The coating was cured at room temperature for 14 days and then evaluated. The cured coating exhibited a crosshatch adhesion of 100% (5B), a pencil hardness of HB, Impact Direct/Reverse strength of 160/120 in-lbs., passed the conical mandrel test, survived 500 methyl ethyl ketone double rubs, and exhibited no salt spray corrosion until about 500 hours. This performance was superior to a commercial water-borne epoxy resin (Epi-Rez WJ-5522 cured with CMD J60-8290, both available from Hi-Tek), but still inferior in a number of respects to a solvent-borne epoxy resin DER 671X75, available from Dow Chemical Co. cured with Versamid 115, available from Henkel Corporation, Ambler, Pa.).

What is claimed is:

1. An epoxy curing agent comprising the reaction product of reactants consisting essentially of an alkylene polyamine having less than about 12 carbon atoms, an aromatic mono-glycidyl ether having less than about 18 carbon atoms, and a diglycidyl ether of an aromatic diol having an average degree of oligomerization of less than about 3.5, wherein:

a ratio of primary amine equivalents of said alkylene polyamine to the total epoxide equivalents of said aromatic mono-glycidyl ether and said diglycidyl ether of an aromatic diol is not less than about 0.85:1, and a ratio of epoxide equivalents of said aromatic mono-glycidyl ether to epoxide equivalents of said diglycidyl ether of an aromatic diol is greater than one.

2. An epoxy curing agent of claim 1 wherein said aromatic mono-glycidyl ether is selected from the group consisting of mono-alkylphenyl glycidyl ethers and di-alkyl phenyl glycidyl ethers having from 9 to 13 carbon atoms.

3. An epoxy curing agent of claim 1 wherein said diglycidyl ether of an aromatic diol having an average degree of oligomerization of less than about 1.5.

4. An epoxy curing agent of claim 1 wherein said diglycidyl ether of an aromatic diol is derived from an alkyl bis-phenol.

5. An epoxy curing agent of claim 1 wherein the ratio of epoxide equivalents of said aromatic mono-glycidyl ether to epoxide equivalents of said diglycidyl ether of an aromatic diol is greater 1.5.

6. An epoxy curing agent of claim 1 wherein the ratio of epoxide equivalents of said aromatic mono-glycidyl ether to epoxide equivalents of said diglycidyl ether of an aromatic diol is from about 2:1 to about 6:1.

7. An epoxy curing agent of claim 1 wherein the ratio of epoxide equivalents of said aromatic mono-glycidyl ether to epoxide equivalents of said diglycidyl ether of an aromatic diol is from about 3:1 to 5:1.

8. An epoxy curing agent of claim 1 wherein said ratio of epoxide equivalents is maintained essentially throughout said reaction by co-addition of said aromatic mono-glycidyl ether and said diglycidyl ether of an aromatic diol.

9. An epoxy curing agent of claim 1 wherein said alkylene polyamine is a member selected from the group consisting of lower alkylene diamines and lower polyalkylene polyamines, said member having from 2 to 8 carbon atoms.

10. An epoxy curing agent of claim 9 wherein said alkylene polyamine has only straight-chain alkylene groups.

11. An epoxy curing agent of claim 1 wherein said alkylene polyamine is a polyalkylene polyamine and the ratio of primary amine equivalents of said alkylene polyamine to the total epoxide equivalents of said aromatic glycidyl ether and said diglycidyl ether of an aromatic diol is essentially one.

12. The epoxy curing agent of claim 1 wherein the ratio of primary amine equivalents of said alkylene polyamine to the total epoxide equivalents of said aromatic mono-glycidyl ether and said diglycidyl ether of an aromatic diol is from about 0.85:1 to about 1.05:1.

13. An epoxy curing agent of claim 1 wherein said alkylene polyamine is a mono-alkylene polyamine and the ratio of primary amine equivalents of said alkylene polyamine to the total epoxide equivalents of said aromatic glycidyl ether and said diglycidyl ether of an aromatic diol is greater than about 1.05:1.

14. An epoxy curing agent of claim 13 wherein said ratio is from about 1.05:1 to 2.0:1.

15. An epoxy curing agent of claim 13 wherein said ratio is from about 1.1:1 to about 1.75:1.

16. An epoxy curing agent of claim 13 wherein said ratio is from about 1.2:1 to about 1.5:1.

17. An epoxy curing agent of claim 13 wherein said alkylene polyamine is further comprised of a polyalkylene polyamine in a minor amount on a molar basis of all alkylene polyamines.

18. An epoxy curing agent of claim 17 wherein the molar ratio of said mono-alkylene polyamine to said polyalkylene polyamine is from about 6:1 to about 2.5:1.

19. An epoxy curing agent of claim 17 wherein the molar ratio of said mono-alkylene polyamine to said polyalkylene polyamine is from about 5:1 to about 3:1.

20. An epoxy curing agent of claim 1 wherein said ratio of epoxide equivalents of said aromatic mono-glycidyl ether to epoxide equivalents of said diglycidyl ether of an aromatic diol is at no time during the entire course of the reaction less than one.

21. An epoxy curing agent of claim 1 wherein said ratio of epoxide equivalents of said aromatic mono-glycidyl ether to epoxide equivalents of said diglycidyl ether of an aromatic diol is at no time during the entire course of the reaction less than the final product ratio of epoxide equivalents of said aromatic mono-glycidyl ether to epoxide equivalents of said diglycidyl ether of an aromatic diol.

22. An epoxy curing agent of claim 1 wherein said ratio of epoxide equivalents of said aromatic mono-glycidyl ether to epoxide equivalents of said diglycidyl ether of an aromatic diol is maintained essentially throughout said reaction.

23. A coating composition comprising an aqueous dispersion of an epoxy resin and an amount of the curing agent of claim 1 effective to harden said epoxy resin, said composition being essentially free of acids.

24. A method of coating a substrate comprising contacting a surface of a substrate with a coating composition of claim 23.

25. A method of claim 24 wherein said coating is a continuous coating and said substrate is a rigid architectural substrate.

26. A coating composition of claim 23 wherein said aromatic mono-glycidyl ether is selected from the group consisting of mono-alkylphenyl glycidyl ethers and dialkyl phenyl glycidyl ethers having from 9 to 13 carbon atoms.

27. A coating composition of claim 23 wherein said diglycidyl ether of an aromatic diol has an average degree of oligomerization of less than about 1.5.

28. A coating composition of claim 23 wherein said diglycidyl ether of an aromatic diol is derived from an alkyl bis-phenol.

29. A coating composition of claim 23 wherein the ratio of epoxide equivalents of said aromatic mono-glycidyl ether to epoxide equivalents of said diglycidyl ether of an aromatic diol is greater than 1.5.

30. A coating composition of claim 23 wherein the ratio of epoxide equivalents of said aromatic mono-glycidyl ether to epoxide equivalents of said diglycidyl ether of an aromatic diol is from about 2:1 to about 6:1.

31. A coating composition of claim 23 wherein the ratio of epoxide equivalents of said aromatic mono-glycidyl ether to epoxide equivalents of said diglycidyl ether of an aromatic diol is from about 3:1 to 5:1.

32. A coating composition of claim 23 wherein said ratio of epoxide equivalents is maintained essentially throughout said reaction by co-addition of said aromatic mono-glycidyl ether and said diglycidyl ether of an aromatic diol.

33. A coating composition of claim 23 wherein said alkylene polyamine is a member selected from the group consisting of lower alkylene diamines and lower polyalkylene polyamines, said member having from 2 to 8 carbon atoms.

34. A coating composition of claim 23 wherein said alkylene polyamine has only straight-chain alkylene groups.

35. A coating composition of claim 23 wherein said alkylene polyamine is a polyalkylene polyamine and the ratio of primary amine equivalents of said alkylene polyamine to the total epoxide equivalents of said aromatic glycidyl ether and said diglycidyl ether of an aromatic diol is essentially one.

36. The coating composition of claim 35 wherein the ratio of primary amine equivalents of said alkylene polyamine to the total epoxide equivalents of said aromatic mono-glycidyl ether and said diglycidyl ether of an aromatic diol is from about 0.85:1 to about 1.05:1.

37. A coating composition of claim 23 wherein said alkylene polyamine is a mono-alkylene polyamine and the ratio of primary amine equivalents of said alkylene polyamine to the total epoxide equivalents of said aromatic glycidyl ether and said diglycidyl ether of an aromatic diol is greater than essentially one.

38. A coating composition of claim 37 wherein said ratio is from about 1.05:1 to 2.0:1.

39. A coating composition of claim 37 wherein said ratio is from about 1.1:1 to about 1.75:1.

40. A coating composition of claim 37 wherein said ratio is from about 1.2:1 to about 1.5:1.

41. A coating composition of claim 37 wherein said alkylene polyamine is further comprised of a polyalkylene polyamine in a minor amount on a molar basis of all alkylene polyamines.

42. A coating composition of claim 41 wherein the molar ratio of said mono-alkylene polyamine to said polyalkylene polyamine is from about 6:1 to about 2.5:1.

43. A coating composition of claim 41 wherein the molar ratio of said mono-alkylene polyamine to said polyalkylene polyamine is from about 5:1 to about 3:1.

44. A coating composition of claim 23 wherein said ratio of epoxide equivalents of said aromatic mono-glycidyl ether to epoxide equivalents of said diglycidyl ether of an aromatic diol is at no time during the entire course of the reaction less than ore.

45. A coating composition of claim 23 wherein said ratio of epoxide equivalents of said aromatic mono-glycidyl ether to epoxide equivalents of said diglycidyl ether of an aromatic diol is at no time during the entire course of the reaction less than the final product ratio of epoxide equivalents of said aromatic mono-glycidyl ether to epoxide equivalents of said diglycidyl ether of an aromatic diol.

46. A coating composition of claim 23 wherein said ratio of epoxide equivalents of said aromatic mono-glycidyl ether to epoxide equivalents of said diglycidyl ether of an aromatic diol is maintained essentially throughout said reaction.

47. A method of claim 24 wherein said aromatic mono-glycidyl ether is selected from the group consisting of mono-alkylphenyl glycidyl ethers and di-alkyl phenyl glycidyl ethers having from 9 to 13 carbon atoms.

48. A method of claim 24 wherein said diglycidyl ether of an aromatic diol having an average degree of oligomerization of less than about 1.5.

49. A method of claim 24 wherein said diglycidyl ether of an aromatic diol is derived from an alkyl bis-phenol.

50. A method of claim 24 wherein the ratio of epoxide equivalents of said aromatic mono-glycidyl ether to epoxide equivalents of said diglycidyl ether of an aromatic diol is greater 1.5.

51. A method of claim 24 wherein the ratio of epoxide equivalents of said aromatic mono-glycidyl ether to epoxide equivalents of said diglycidyl ether of an aromatic diol is from about 2:1 to about 6:1.

52. A method of claim 24 wherein the ratio of epoxide equivalents of said aromatic mono-glycidyl ether to epoxide equivalents of said diglycidyl ether of an aromatic diol is from about 3:1 to 5:1.

53. A method of claim 24 wherein said ratio of epoxide equivalents is maintained essentially throughout said reaction by co-addition of said aromatic mono-glycidyl ether and said diglycidyl ether of an aromatic diol.

54. A method of claim 24 wherein said alkylene polyamine is a member selected from the group consisting of lower alkylene diamines and lower polyalkylene polyamines, said member having from 2 to 8 carbon atoms.

55. A method of claim 24 wherein said alkylene polyamine has only straight-chain alkylene groups.

56. A method of claim 24 wherein said alkylene polyamine is a polyalkylene polyamine and the ratio of primary amine equivalents of said alkylene polyamine to the total epoxide equivalents of said aromatic glycidyl ether and said diglycidyl ether of an aromatic diol is essentially one.

57. The coating composition of claim 56 wherein the ratio of primary amine equivalents of said alkylene polyamine to the total epoxide equivalents of said aromatic mono-glycidyl ether and said diglycidyl ether of an aromatic diol is from about 0.85:1 to about 1.05:1.

58. A method of claim 24 wherein said alkylene polyamine is a mono-alkylene polyamine and the ratio of primary amine equivalents of said alkylene polyamine to the total epoxide equivalents of said aromatic glycidyl ether and said diglycidyl ether of an aromatic diol is greater than essentially one.

59. A method of claim 58 wherein said ratio is from about 1.05:1 to 2.0:1.

60. A method of claim 58 wherein said ratio is from about 1.1:1 to about 1.75:1.

61. A method of claim 58 wherein said ratio is from about 1.2:1 to about 1.5:1.

62. A method of claim 58 wherein said alkylene polyamine is further comprised of a polyalkylene polyamine in a minor amount on a molar basis of all alkylene polyamines.

63. A method of claim 62 wherein the molar ratio of said mono\alkylene polyamine to said polyalkylene polyamine is from about 6:1 to about 2.5:1.

64. A method of claim 62 wherein the molar ratio of said mono-alkylene polyamine to said polyalkylene polyamine is from about 5:1 to about 3:1.

65. A method of claim 24 wherein said ratio of epoxide equivalents of said aromatic mono-glycidyl ether to epoxide equivalents of said diglycidyl ether of an aromatic diol is at no time during the entire course of the reaction less than one.

66. A method of claim 24 wherein said ratio of epoxide equivalents of said aromatic mono-glycidyl ether to epoxide equivalents of said diglycidyl ether of an aromatic diol is at no time during the entire course of the reaction less than the final product ratio of epoxide equivalents of said aromatic mono-glycidyl ether to epoxide equivalents of said diglycidyl ether of an aromatic diol.

67. A method of claim 24 wherein said ratio of epoxide equivalents of said aromatic mono-glycidyl ether to epoxide equivalents of said diglycidyl ether of an aromatic diol is maintained essentially throughout said reaction.

68. An epoxy curing agent of claim 1 wherein the ratio of primary amine equivalents of said alkylene polyamine to the total epoxide equivalents of said aromatic mono-glycidyl ether and said diglycidyl ether of an aromatic diol is from about 0.90:1 to about 0.95:1.

69. The coating composition of claim 36 wherein the ratio of primary amine equivalents of said polyamine to the total epoxide equivalents of said aromatic mono-glycidyl ether and said diglycidyl ether of an aromatic diol is from about 0.90:1 to about 0.95:1.

70. The coating composition of claim 57 wherein the ratio of primary amine equivalents of said polyamine to the total epoxide equivalents of said aromatic mono-glycidyl ether and said diglycidyl ether of an aromatic diol is from about 0.90:1 to about 0.95:1.

\* \* \* \* \*